United States Patent
Klocke (10) Patent No.: US 11,684,038 B2
(45) Date of Patent: Jun. 27, 2023

(54) SWINE ACTIVATED FEEDER WITH ACTUATION SENSOR

(71) Applicant: Dave Klocke, Templeton, IA (US)

(72) Inventor: Dave Klocke, Templeton, IA (US)

(*) Notice: Subject to any disclaimer, the term of this patent is extended or adjusted under 35 U.S.C. 154(b) by 0 days.

(21) Appl. No.: 17/655,264

(22) Filed: Mar. 17, 2022

(65) Prior Publication Data

US 2022/0201974 A1  Jun. 30, 2022

Related U.S. Application Data

(62) Division of application No. 16/678,031, filed on Nov. 8, 2019, now abandoned.

(60) Provisional application No. 62/757,464, filed on Nov. 8, 2018.

(51) Int. Cl.
*A01K 5/02* (2006.01)
*A01K 29/00* (2006.01)

(52) U.S. Cl.
CPC .......... *A01K 5/0241* (2013.01); *A01K 29/005* (2013.01)

(58) Field of Classification Search
CPC .. A01K 5/0241; A01K 29/005; A01K 5/0233; A01K 7/06
USPC .......................................................... 119/75
See application file for complete search history.

(56) References Cited

U.S. PATENT DOCUMENTS

| | | | |
|---|---|---|---|
| 1,346,784 A | 7/1920 | Hamilton | |
| 2,207,395 A | 7/1940 | Brown | |
| 2,723,783 A | 11/1955 | Ewin | |
| 4,270,489 A | 6/1981 | Joronen | |
| 4,353,329 A | 10/1982 | Thibault | |
| 4,582,023 A | 4/1986 | Zumbahlen et al. | |
| 5,275,130 A | 1/1994 | Muckler | |
| 5,335,625 A * | 8/1994 | Rawlings | A01K 7/02 119/77 |
| 5,355,833 A | 10/1994 | Legrain | |
| 5,579,719 A | 12/1996 | Hoff et al. | |
| 5,782,201 A | 7/1998 | Wells | |
| 5,911,195 A | 6/1999 | Tripp et al. | |
| 8,453,601 B2 | 6/2013 | Zimmerman | |
| 8,930,148 B2 | 1/2015 | Huisma | |
| 9,220,236 B2 * | 12/2015 | Klocke | A01K 5/0241 |
| 9,295,226 B2 | 3/2016 | Brooks | |
| 9,374,981 B2 | 6/2016 | Powers | |
| 9,408,369 B2 | 8/2016 | Dubinsky | |
| 9,848,577 B1 | 12/2017 | Brandao et al. | |

(Continued)

FOREIGN PATENT DOCUMENTS

CN  101861837 A  10/2010
CN  204650323 U  9/2015

(Continued)

*Primary Examiner* — Joshua J Michener
*Assistant Examiner* — Nicole Paige MacCrate
(74) *Attorney, Agent, or Firm* — McKee, Voorhees & Sease, PLC (57) ABSTRACT

A sensor assembly on a swine-activated self-feeder allows monitoring or tracking of individual animal feeding activity, thereby allowing corrective action to be taken in instances of under-feeding or over-feeding by an animal. The sensor assembly includes a sensor on the feed dispenser and, with a printed circuit board to generate a signal corresponding to activation of the dispenser by an animal. The signal can be sent to a computer or website which generates reports on the individual animal's feeding activity.

18 Claims, 11 Drawing Sheets

(56) References Cited

U.S. PATENT DOCUMENTS

| | | | |
|---|---|---|---|
| 9,861,081 B2 | 1/2018 | Borchersen et al. | |
| 2008/0252464 A1* | 10/2008 | Panasevich | G07C 9/28 |
| | | | 340/573.1 |
| 2010/0095895 A1* | 4/2010 | Laliberta | A01K 5/0275 |
| | | | 119/57.1 |
| 2015/0355003 A1 | 12/2015 | Saeger et al. | |
| 2015/0373945 A1* | 12/2015 | Sung | A01K 5/0283 |
| | | | 119/51.02 |
| 2016/0050888 A1* | 2/2016 | Berckmans | A01K 39/02 |
| | | | 119/51.01 |
| 2016/0258758 A1 | 9/2016 | Houston et al. | |
| 2017/0013802 A1* | 1/2017 | Zimmerman | G06K 7/10366 |
| 2017/0127975 A1 | 5/2017 | Bozkurt | |
| 2017/0223926 A1* | 8/2017 | Ausman | A01K 11/006 |
| 2017/0273277 A1* | 9/2017 | Monk | A01K 29/005 |
| 2018/0092331 A1 | 4/2018 | Zuidhof et al. | |
| 2018/0211718 A1 | 7/2018 | Heath | |

FOREIGN PATENT DOCUMENTS

| | | | |
|---|---|---|---|
| CN | 107331109 A | 11/2017 | |
| CN | 206776432 U | 12/2017 | |
| FR | 2563078 A1 | 10/1985 | |
| JP | 4228017 A | 8/1992 | |
| JP | 2004180543 A | 7/2004 | |
| WO | 2018058232 A1 | 4/2018 | |

\* cited by examiner

SWINE ACTIVATED FEEDER WITH ACTUATION SENSOR

CROSS-REFERENCE TO RELATED APPLICATIONS

This is a divisional application of U.S. Ser. No. 16/678,031, filed Nov. 8, 2019, which claims priority to Provisional Application U.S. Ser. No. 62/757,464, filed on Nov. 8, 2018, which is herein incorporated by reference in its entirety.

BACKGROUND OF THE INVENTION

In the hog industry, proper feeding of gilts and sows is important to the health of the animal, as well as the overall productivity and profitability of the farming operation. As described in Applicant's U.S. Pat. No. 9,220,236 issued on Dec. 29, 2015, feeding systems include community self-feeding wherein numerous animals feed at a common station, or alternatively, individual stall feeders in the gestation barn. Transitioning from the group feeding to the individual feeder may be problematic or difficult for some animals, if they over-feed or under-feed. Therefore, to optimize the overall farming operation, it is important to monitor or track the feeding activity of the individual animals.

Accordingly, a primary objective of the present invention is the provision of a sensor associated with a swine-powered self-feeder to monitor feeding activity of individual swine.

Another objective of the present invention is a provision of a method of tracking feeding activity of individual swine, by sensing actuation of a swine-powered dispenser on a self-feeder so as to generate data for evaluation of the feeding activity for an individual animal.

A further objective of the present invention is the provision of a feeding system to track individual animal feeing activities.

Yet another objective of the present invention is a provision of an improvement to a swine-activated self-feeder utilizing a sensor to monitor an individual animal.

A further objective of the present invention is the provision of a feeding activity sensor which tracks different animals via RFID technology, or by facial or body recognition.

Still another objective of the present invention is a provision of an animal feeder having a feed dispenser movable by the animal to discharge feed from a feed supply line and a sensor operatively connected to the dispenser to generate a signal in response to movement of the dispenser by the animal, to thereby track the feeding activity and measure the amount of feed consumed by the animal.

These and other objectives become apparent from the following description of the invention.

DETAILED DESCRIPTION OF THE INVENTION

The present invention is directed toward an improvement to Applicant's sow gestation and farrowing tube feeder shown and described in U.S. Pat. No. 9,220,236, which is incorporated herein by reference in its entirety.

Figure 1:
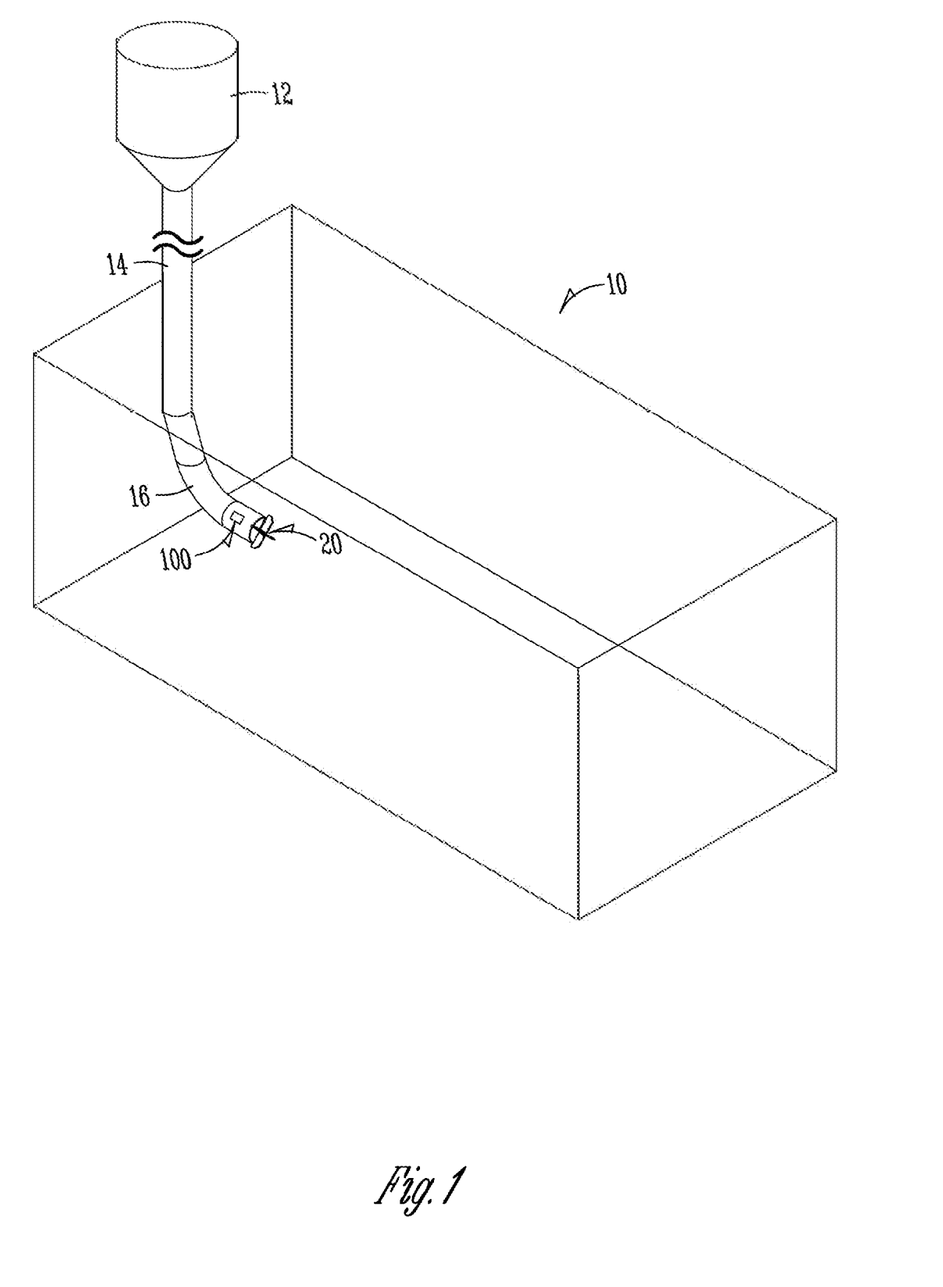
FIG. 1 is a schematic sketch of a farrowing crate having a conventional feed hopper and drop tube, with the dispenser in the lower end of the tube for actuation by a swine, and a sensor on the dispenser, according to the present invention.
Figure 2:
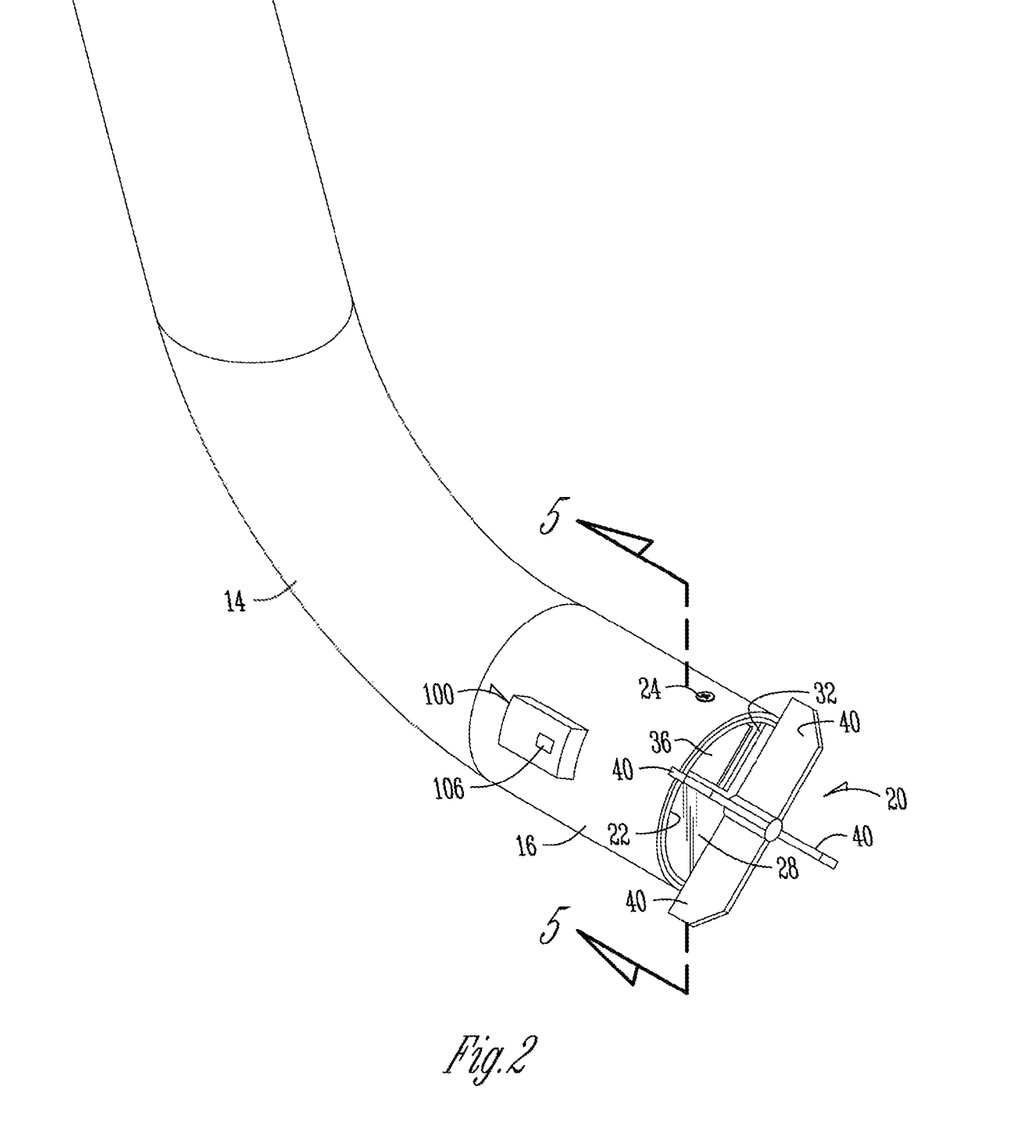
FIG. 2 is an enlarged view of the lower end of the drop tube with a rotatable dispenser for actuation by the swine, and the sensor.
Figure 3A:
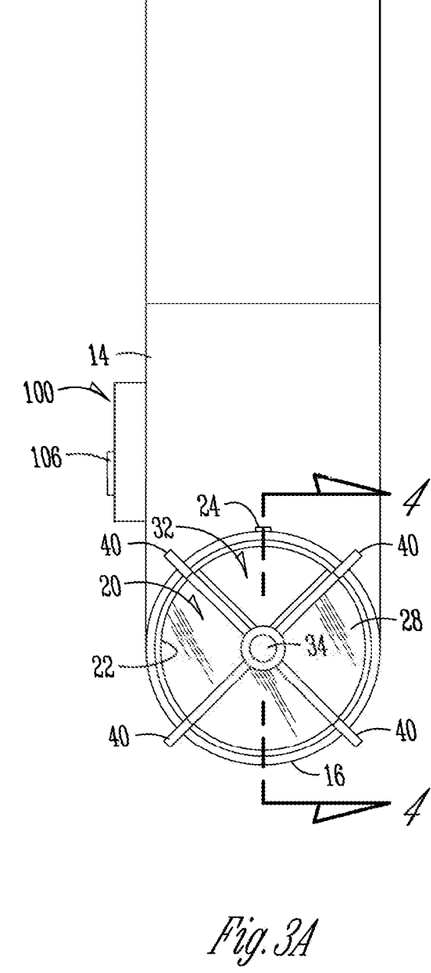
FIG. 3A is an end view of the tube and dispenser with the spokes in a first position.
Figure 3B:
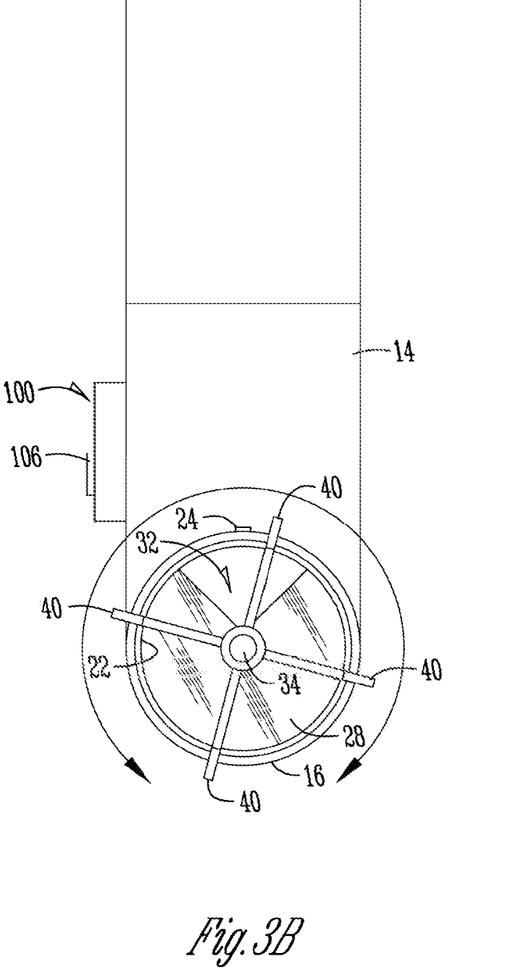
FIG. 3B is a view similar to FIG. 3A with the spokes in a second rotated position.

A conventional sow farrowing crate is schematically shown in FIG. 1 and designated by the reference numeral 10. The stall 10 is one of many placed side-by-side in a gestation barn. A feeding system in the barn provides feed for each stall 10. More particularly, the feeding system for each stall 10 includes a hopper 12 with a gravity drop tube 14 having a lower end 16 adjacent the floor of the stall 10. The hopper 12 can be loaded in a known manner, such as by an auger system or manual filling, so that feed fills the tube 14.

Figure 6:
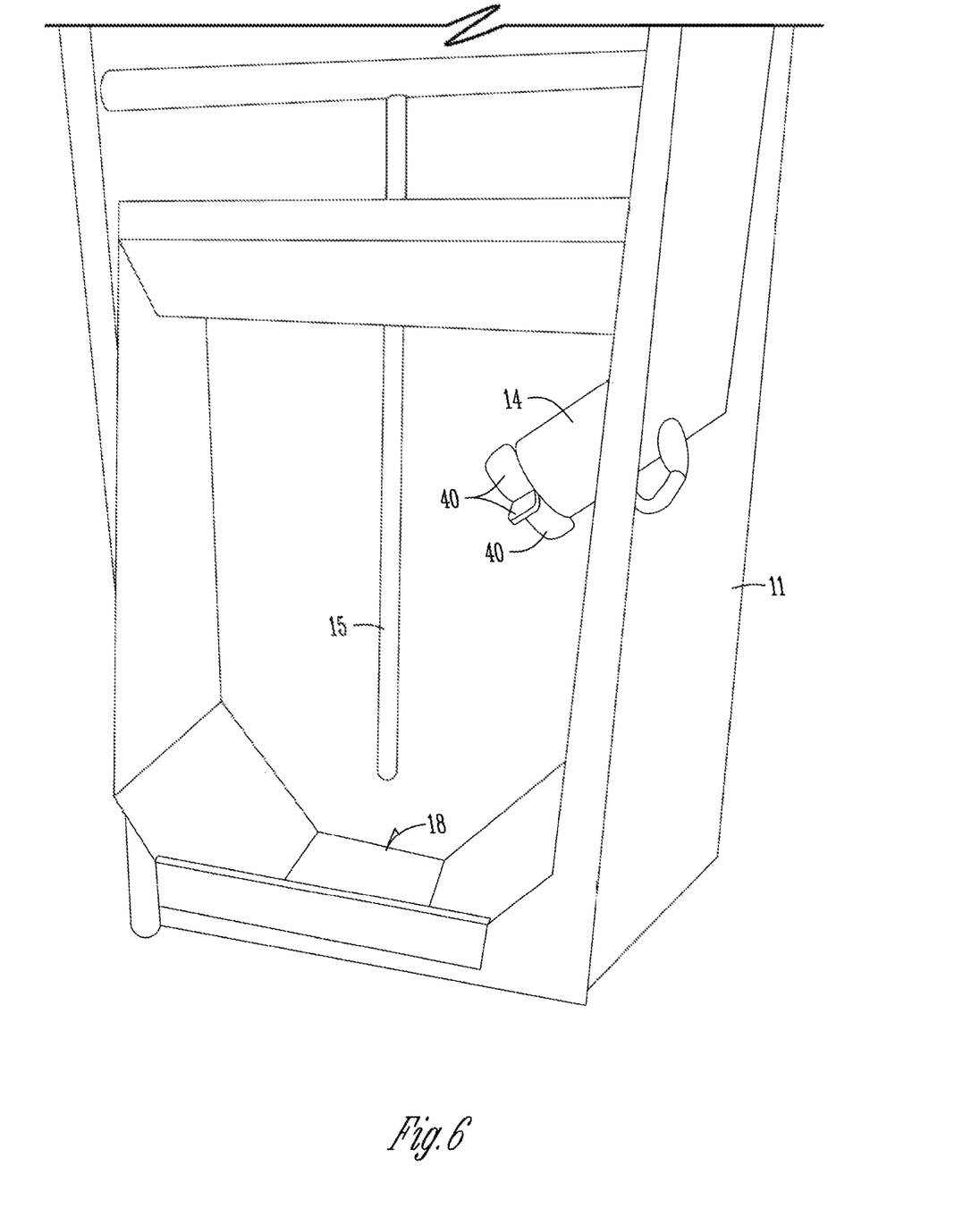
FIG. 6 is a front view of an individual feed station having a self-activated feed tube and sensor according to the present invention.
Figure 7:
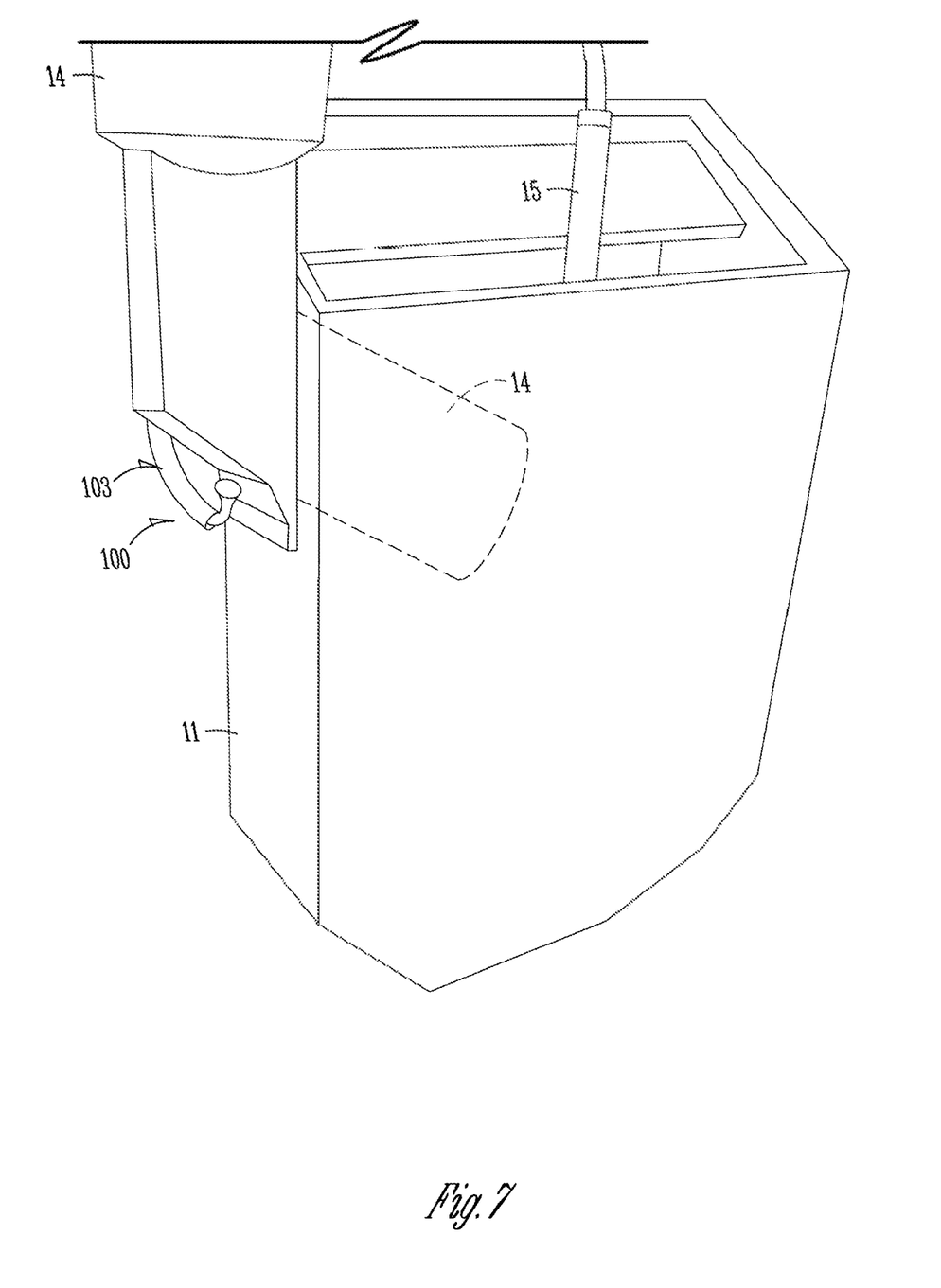
FIG. 7 is a rear perspective view of the feed station of FIG. 6.
Figure 8:
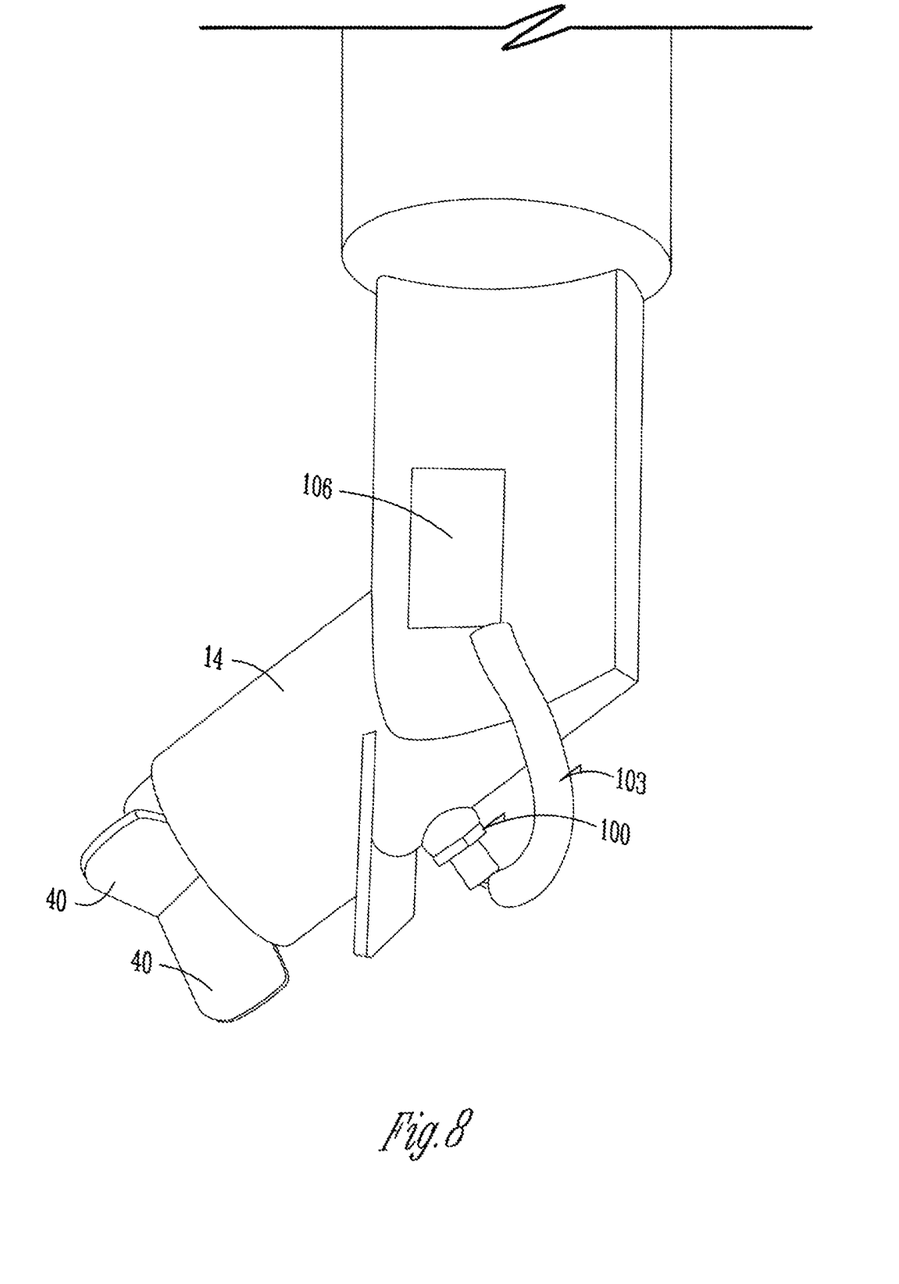
FIG. 8 is another view showing the sensor and circuit board, according to the present invention.

As an alternative to the crate 10, the feed system may be utilized with a feed station 11 (FIGS. 6-8) with the tube 14 depositing feed into a pan or bowl 18 near the bottom or floor of the feed station. The feed station may also include a water line 15 to provide water into the bowl 18 via a hog-activated nipple in the end of the line 15.

Figure 4:
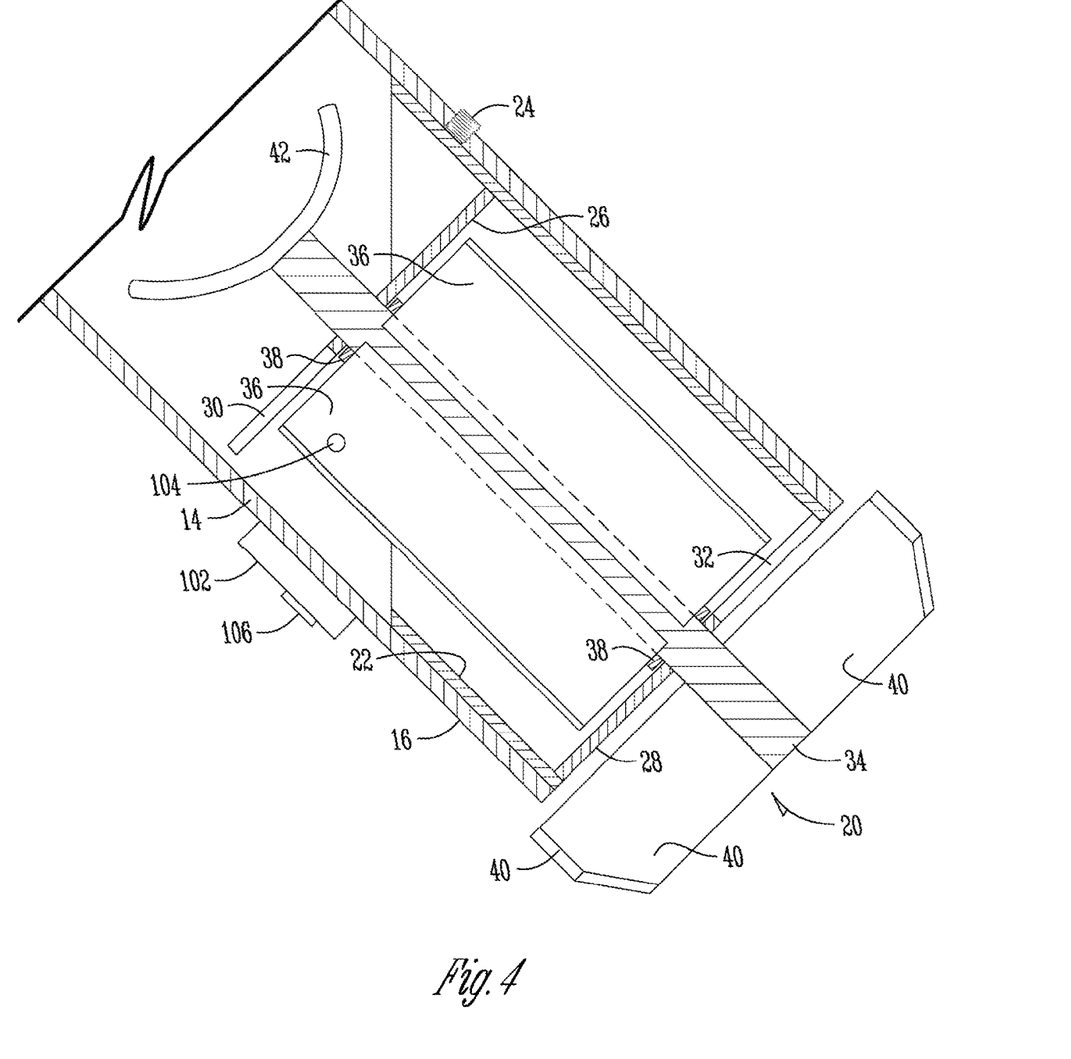
FIG. 4 is a sectional view of the dispenser taken along lines 4-4 of FIG. 3A.

The feed tube dispenser 20 is in the form of an insert which fits into the lower end 16 of the tube 14 so as to convert the tube 14 from a standard gravity drop system to a self-feeding or ad libitum system. More particularly, the dispenser 20 includes a cylindrical body or housing 22 which matingly fits inside the lower end 16 of the tube 14, as best seen in FIG. 4. The body 22 may be secured, latched, or fixed in the tube 14 by a set screw 24, a self-tapping screw, or any other convenient means. Preferably, the screw 24 does not extend through the body 22.

Figure 5:
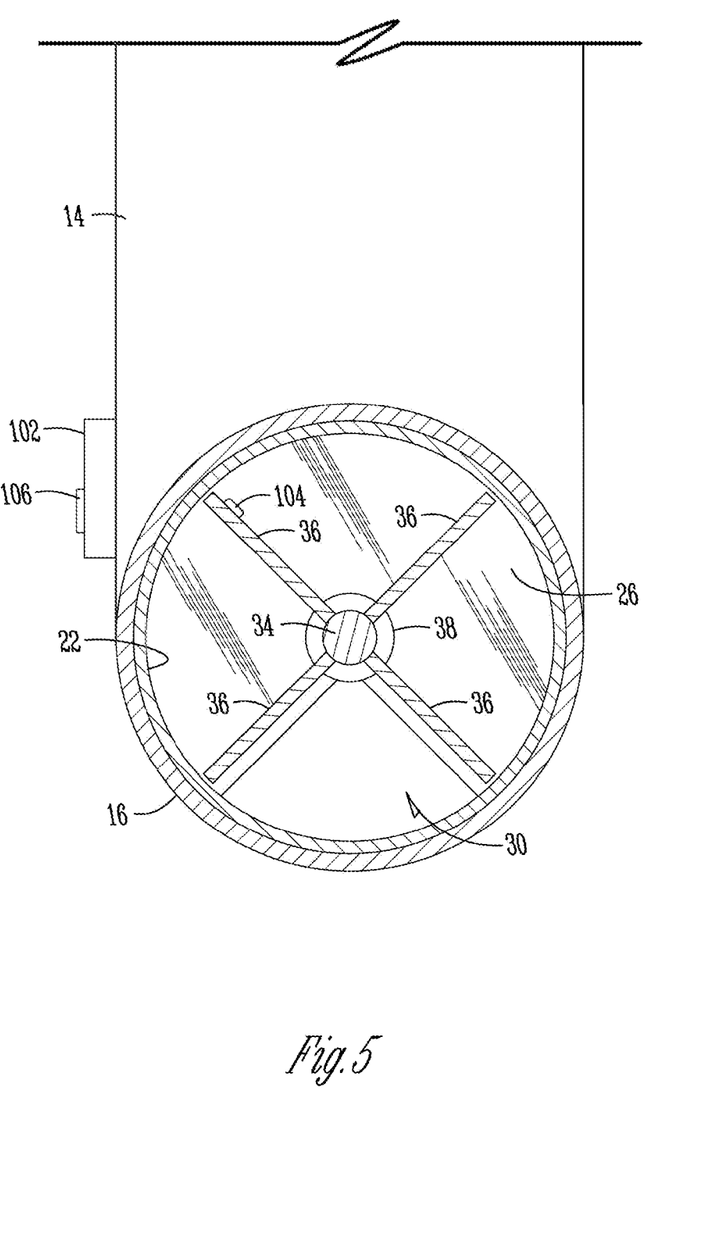
FIG. 5 is a sectional view of the dispenser taken along lines 5-5 of FIG. 2.

The body 22 includes an upper plate 26 and a lower plate 28 fixed at the opposite ends of the body. The upper plate has a feed inlet 30 preferably located on a lower portion of the plate, for example, at the 6 o'clock position. The lower plate 28 has a feed outlet 32 on an upper portion of the plate, for example, at the 12 o'clock position. Thus, the inlet 30 and outlet 32 are offset with respect to one another. The plates 26, 28 rotatably support an axle 34 extending through the plates. A plurality of fins 36 extends radially outwardly from the axle 34 and have outer edges in close proximity to the interior wall of the body 22, as best seen in FIG. 5. A washer 38 is mounted on the axle 34 adjacent the plates 26, 28, so as to space the upper and lower ends of the fins 36 from the plates 26, 28, as shown in FIG. 4.

A spinner or actuator comprising a plurality of spokes 40 extends radially outwardly from the lower end of the axle 34, outside of the body 22. Preferably, the outer ends of the spokes 40 extend beyond the perimeter of the body 22. While the drawings show four spokes 40, it is understood that the number and shape of spokes 40 may vary from that shown in the drawings.

A stirring device 42, such as a bar or finger, is fixed on the upper end of the axle 34 so as to rotate with the axle. The bar 42 resides upstream from the upper plate 26 so as to stir feed in the tube 14, and thereby prevent clogging or bridging of the feed within the tube 14. The stirring device 42 may be any shape, or size, or material to stir the feed in the tube 14, including a rigid or flexible member.

Figure 9:
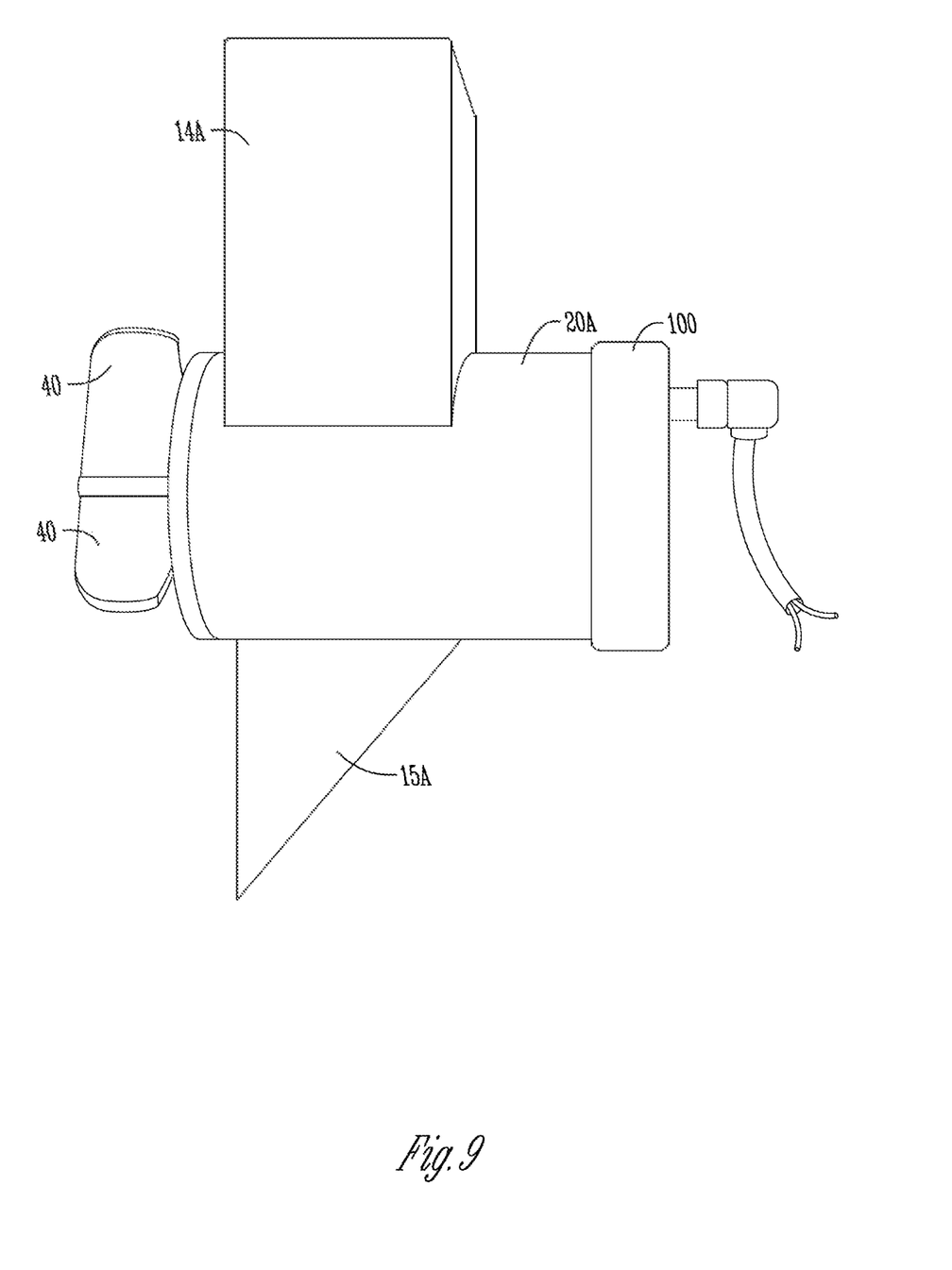
FIG. 9 is an alternative view of the feed dispense with a vertical orientation.
Figure 10:
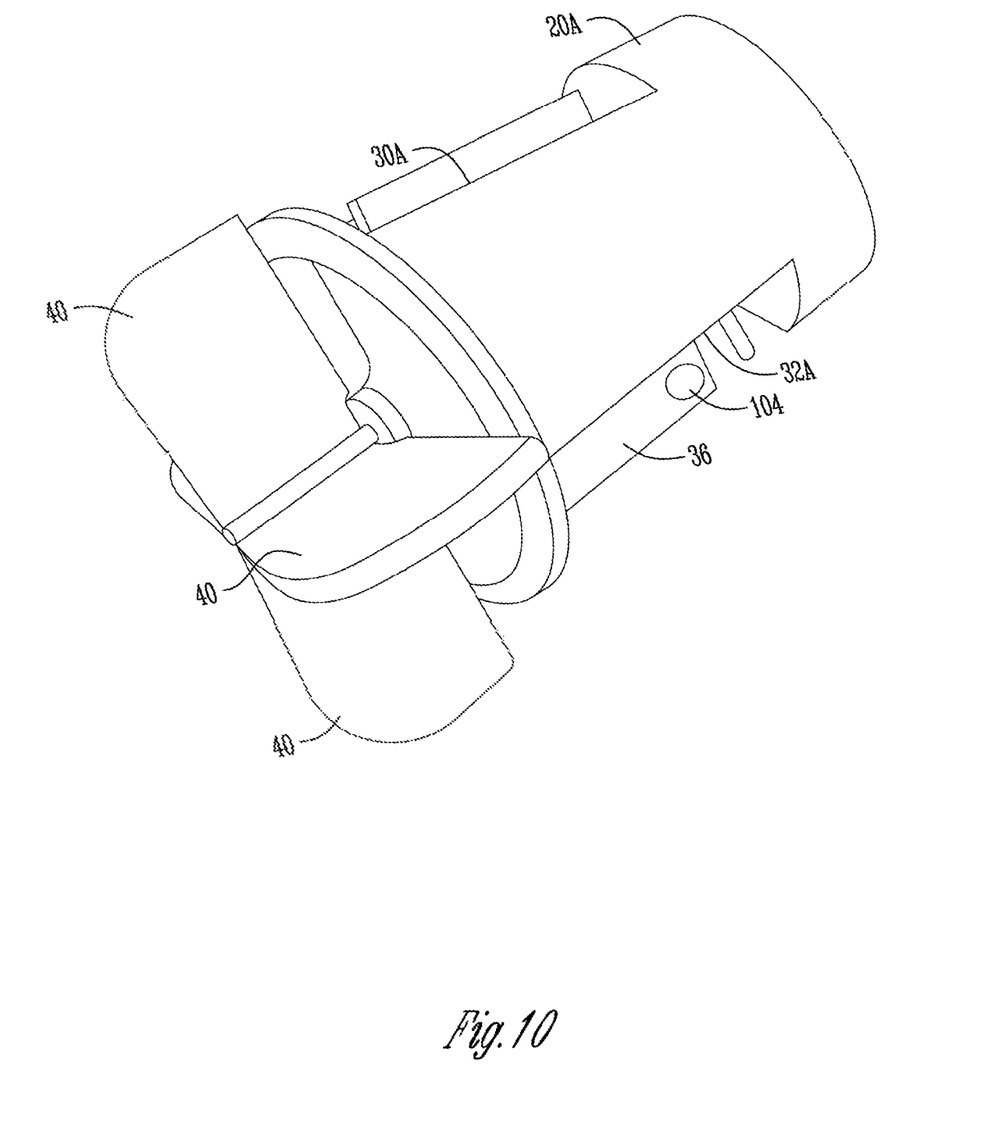
FIG. 10 is a close-up view showing the feed dispenser for the vertical feeding tube shown in FIG. 9 and having a magnet on the rotatable fin for sensing by a Hall-effect sensor.
Figure 11:
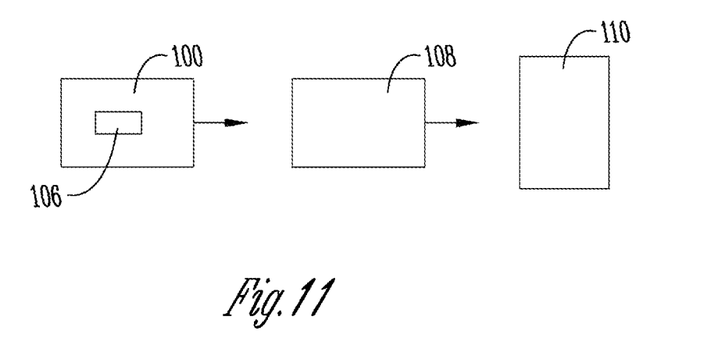
FIG. 11 is a schematic flow chart of one embodiment of the sensor and controls of the present invention.
Figure 12:
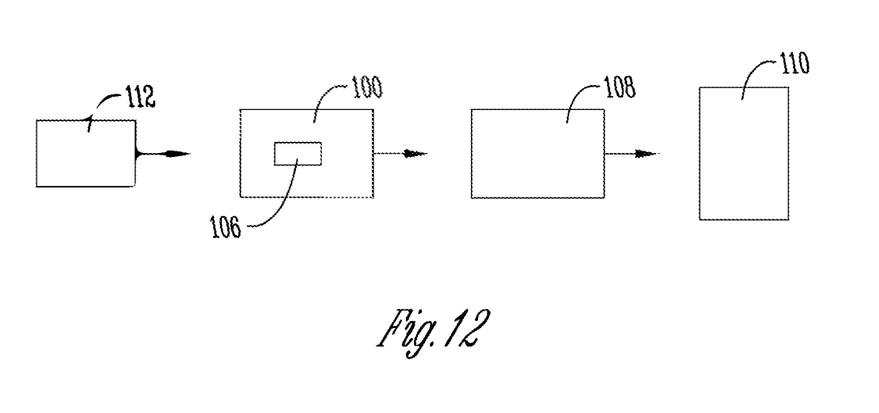
FIG. 12 is another schematic flow chart of a second embodiment of the invention for use with an RFID tag on an animal.

In an alternative embodiment, shown in FIG. 9, the feeding system has a vertical tube 14A connected to the hopper, and the dispenser 20A has an upper inlet 20A and a lower outlet 32A, shown in FIG. 10. The dispenser 20A functions similarly to the dispenser 20 to provide feed on demand when the animal spins the spokes 40, so that feed drops from the tube outlet 15A. The vertical orientation allows feed chambers in the dispenser to be filled completely for better feed flow and measuring of feed passing through the dispenser 20A, as compared to the sloped dispenser 20 of FIGS. 1-8.

In use, when the dispenser 20 is installed in the tube 14, the plates 26, 28 effectively close the lower end of the tube 14, which is normally open in a conventional drop tube feeder. Thus, the dispenser 20 prevents feed from being discharged from the tube 14 until a gilt or sow in the stall 10 nudges the spokes 40 to rotate the axle 34. Such rotation of the axle 34 also rotates the attached fins 36, such that feed which has entered the body 22 of the dispenser 20 through the inlet 30 in the upper plate 26 is carried upwardly by the fins 36 along the inner wall of the body 22 for discharge through the feed outlet 32 in the lower plate 28. Since the tube 14 is angled downwardly, as seen in FIGS. 1 and 4, feed carried by the fins 36 to the outlet 32 will discharge by gravity over the spokes 40 and onto the floor of the stall or feed pan or bowl 18 for consumption by the gilt or sow. Also, the depth of the spokes 40 carries the feed beyond the lower plate 28 so as to deposit the feed further from the lower end 16 of the tube 14, for easier access by the gilt or sow or growing market hog.

The structure of the various components of the dispenser 20 can be modified without departing from the scope of the present invention. For example, as shown in FIG. 4, the upper end of the body 22 is shown to be cut at an angle of approximately 45° which facilitates assembly of the body 22 inside the tube 14. This angle can be more or less than that shown in the drawings or can be eliminated. Also, the shape of the fins 36 may be modified, such as a curved, cup-like surface, or maybe an auger flighting to carry feed from the inlet 30 to the outlet 32.

The device 20 can be quickly and easily retrofit into the feed tube 14 for each stall or crate 10 in a gestation or farrowing barn. While the volume of the feed provided to the gilt or sow is controlled by the volume in the hopper 12, the gilt or sow controls the timing of the feed discharge into the bowl or pan 18 by actuation of the spokes 40. Since the gilt or sow will actuate the self-feeder device 20 of the present invention when she is hungry, the animal will consume the discharged feed, substantially reducing or eliminating feed waste which occurs with a conventional drop feed system. Also, since there is no waste feed being washed out of the stall or crate 10 by the cleaning system, clogging of drain troughs by waste feed is eliminated, thereby saving labor costs and time.

The improvement to the tube feeder described above relates to a sensor and method for tracking or monitoring the feeding activity of individual sows or market hog. More particularly, as shown in FIGS. 1-8, a sensor assembly 100 is provided on the feed tube 14.

In a preferred embodiment, the assembly 100 includes a Hall-effect sensor 102 mounted on the feed tube 14, a magnet 104 mounted on one of the fins 36, and a printed circuit board (PCB) 106 operatively connected to the sensor 102 via wires 103 or wirelessly. One example of the sensor 102 which can be utilized in the sensor assembly 100 of the present invention, is the SR4 series Magneto Resistive Digital Position Sensor sold by Honeywell. See https://sensing.honeywell.com/SR4P3-A1-value-added-magnetic-sensors.

In the alternative vertical feed system of FIG. 9, the sensor assembly 100 is mounted on the rear end of the dispense 20A, rather than on the tube 14.

When the sow turns the spokes 40 to dispense feed from the tube 14, the magnet 104 moves past the sensor 102 so as to generate a signal corresponding to the swine's actuation of the feeder system. The circuit board 106 logs the rotations of the spokes 40 and transmits this data wirelessly to a computer or microprocessor, such as CPU 108, or to a website which can then provide feedback to the operator regarding the individual animal's feeding activity. One example of such a website is www.thingspeak.com, which is an open IoT analytics platform which allows data to be collected for private or public use, via the cloud. The data is transmitted via the circuit board 106 to the processor or microprocessor 108, which stores the data and generates reports 110 on demand. For example, the reports can be a plot for each feeder, showing a timeline of when each sow or pig activated the spokes 40 of the specific feeder. The plots and other data generated by the sensor 102 and circuit board 106 can be used to evaluate whether individual animals are under-feeding or over-feeding, so that corrective action can be taken.

In an alternative embodiment of the invention, the sensor assembly 100 can be used on a community feeding station in conjunction with an additional identification device 112 to identify specific sows or growing pigs for monitoring their respective individual feeding activity. For example, the device 112 can be an RFID tag with each sow or pig can have a personalized RFID tag which is detected in a known manner when the animal activates the dispenser 20. Another example is for the device 112 to be a camera for individual animal recognition, such as facial and body recognition. Thus, the sensor assembly 100 can provide specific feeding activity information and data regarding each animal which uses a common feeder.

For example, the sensor assembly may also be used on each feeder station as shown in Applicant's co-pending application Ser. No. 16/415,407 filed on May 17, 2019, entitled Wet/Dry Feeder for Swine, and incorporated herein by reference in its entirety.

Thus, the sensor assembly 100 of the present invention allows the farmer or operator to track or monitor individual feeding activity in both separate feeder stalls or community feeding environments. The individual feeding activity can be plotted or charted, and notifications can be sent to the operator to provide alerts for changes in feeding activity for specific animals.

It is understood that other types of motion sensors can be utilized, other than the Hall-effect sensor 102 described above. Also, additional software can be developed to provide desired feedback regarding the sow feeding activity. Thus, the overall swine feeding operation can be closely monitored for improved animal health, productivity, and profitability.

The feed system of the present invention can be used to report the amount of feed dispensed into individual feeder, pen, or whole barn which aids in feed inventory tracking, feed ordering, and evaluating health of the barn or individual pigs being tracked. The feed system can also be used to report the size of the individual pig being tracked based on how much feed has been consumed.

It is also understood that the feed monitoring system and method of the present invention can be used for similar feed systems used by animals other than swine, wherein the animal manually actuates dispensement of feed on an individual, ad lib basis, rather than a motorized or timed feed dispensing system.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. A method of tracking feeding activity of swine, comprising:
   providing feed on demand from a self-feeder wherein the swine actuates discharge of feed from the self-feeder by rotating a dispenser in a lower end of a feed tube;
   sensing swine actuation of the self-feeder;
   generating data corresponding to the sensed swine actuation of the feeder; and
   evaluating the data to track the swine feeding activity.

2. The method of claim 1 wherein the dispenser includes a magnet for sensing by a sensor to count rotations of the dispenser.

3. The method of claim 1 wherein the data includes time of day of actuation.

4. The method of claim 1 wherein the data includes frequency of actuation.

5. The method of claim 1 wherein the sensing step utilizes a Hall effect sensor.

6. The method of claim 1 further comprising identifying the swine with an RFID tag.

7. The method of claim 1 wherein the data further corresponds to volume of feed dispensed.

8. The method of claim 1 further comprising storing the data on a microprocessor.

9. The method of claim 1 further comprising identifying the swine with a facial or body recognition camera.

10. A method of tracking feeding activity of each individual swine in a herd of swine, comprising:
    marking each swine in the herd with a unique identifier;
    providing an ad lib self-feeding station that allows only one swine to feed at a time from the station, wherein the one swine actuates a dispenser to drop feed into the station by rotating an actuator on the self-feeding station with its nose;
    identifying each of the swine who actuates the dispenser;
    generating a signal each time the dispenser is actuated;
    creating a database of the signals;
    evaluating the signals to track the feeding activity of each identified swine.

11. The method of claim 10 wherein the evaluation includes the number of times each swine actuates the dispenser.

12. The method of claim 10 wherein the evaluation includes a volume of food dispensed by each swine.

13. The method of claim 10 wherein the signal is generated magnetically upon rotation of the dispenser.

14. The method of claim 10 wherein each swine is identified with an RFID tag.

15. The method of claim 10 wherein each swine is identified by a camera.

16. The method of claim 10 wherein each swine is identified by facial or body recognition.

17. The method of claim 10 wherein the signal identifies the time of day that the one swine actuated the dispenser.

18. The method of claim 10 wherein the signal is generated by a Hall effect sensor on the self-feeder.

* * * * *